US012624763B2

(12) United States Patent
Marocchini et al.

(10) Patent No.: US 12,624,763 B2
(45) Date of Patent: *May 12, 2026

(54) MODULAR AIR VALVE SYSTEM

(71) Applicant: Hamilton Sundstrand Corporation, Charlotte, NC (US)

(72) Inventors: Francis P. Marocchini, Somers, CT (US); Robert DeFelice, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,568

(22) Filed: Nov. 15, 2023

(65) Prior Publication Data

US 2025/0155027 A1     May 15, 2025

(51) Int. Cl.
| | |
|---|---|
| *F16K 1/22* | (2006.01) |
| *F16K 11/052* | (2006.01) |
| *F16K 27/02* | (2006.01) |
| *F16K 31/52* | (2006.01) |

(52) U.S. Cl.
CPC .......... F16K 1/223 (2013.01); F16K 27/0218 (2013.01); *F16K 11/0525* (2013.01); *F16K 31/521* (2013.01)

(58) Field of Classification Search
CPC .......... F16K 1/221; F16K 1/2007; F16K 1/20; F16K 1/2021; F16K 1/22; F16K 1/223; F16K 11/052; F16K 11/0525; F16K 27/0218; F16K 31/521
See application file for complete search history.

(56) References Cited

U.S. PATENT DOCUMENTS

| | | | |
|---|---|---|---|
| 3,837,620 | A | 9/1974 | Malloy et al. |
| 3,988,000 | A | 10/1976 | Reese |
| 4,512,372 | A * | 4/1985 | Lew .................... F16K 11/0525 |
| | | | 251/162 |
| 4,655,252 | A | 4/1987 | Krumhansi |
| 4,659,064 | A | 4/1987 | Scobie et al. |
| 4,774,750 | A | 10/1988 | Platusich |
| 5,150,731 | A | 9/1992 | Jiro |
| 5,839,717 | A | 11/1998 | Feigel |

(Continued)

FOREIGN PATENT DOCUMENTS

| | | |
|---|---|---|
| CN | 105587870 A | 5/2016 |
| CN | 108361425 A | 8/2018 |

(Continued)

OTHER PUBLICATIONS

Machine English translation of CN_114396480_A (Year: 2025).*

(Continued)

*Primary Examiner* — Hailey K. Do
(74) *Attorney, Agent, or Firm* — Kinney & Lange, P.A.

(57) ABSTRACT

In accordance with at least one aspect of this disclosure, a modular valve system includes, at least a first valve. The first valve can be configured to connect to one or more additional valves. The first valve includes, a first housing having a first inlet and a first outlet with a cylindrical flow path through the housing defined between the first inlet and the first outlet along a flow axis, where a diametral plane is defined diametrically spanning the cylindrical flow path.

20 Claims, 9 Drawing Sheets

(56)          References Cited

U.S. PATENT DOCUMENTS

| | | | |
|---|---|---|---|
| 7,302,969 B2 | 12/2007 | Hasegawa et al. | |
| 7,314,032 B2 * | 1/2008 | Nakayama | F02D 9/109 |
| | | | 123/184.55 |
| 8,161,996 B2 | 4/2012 | Barker et al. | |
| 8,162,288 B2 | 4/2012 | Broeders et al. | |
| 9,506,571 B1 | 11/2016 | Mccormack | |
| 2002/0056824 A1 | 5/2002 | Rentschler et al. | |

FOREIGN PATENT DOCUMENTS

| | | | | | |
|---|---|---|---|---|---|
| CN | 113833865 | A | * | 12/2021 | B01D 35/04 |
| CN | 114396480 | A | * | 4/2022 | |
| CN | 115492938 | A | | 12/2022 | |
| DE | 102016204440 | A1 | | 9/2017 | |
| DE | 102019127890 | B3 | | 12/2020 | |
| EP | 0702175 | A1 | * | 3/1996 | |
| EP | 1503062 | A1 | | 2/2005 | |
| EP | 1291509 | B1 | | 10/2006 | |
| FR | 2606115 | A1 | | 5/1988 | |
| WO | WO-2016160760 | A1 | * | 10/2016 | |

OTHER PUBLICATIONS

Machine English translation of CN_113833865_A (Year: 2025).*

Partial European Search Report for EP Application No. 24200355.6, Dated Feb. 13, 2025, pp. 17.

European Extended Search Report for European Application No. 21200355.6, dated May 7, 2025, 17 pages,.

Extended European Search Report for EP Application No. 24200397. 8, dated Feb. 17, 2025, 14 pages,.

Extended European Search Report for European Patent Application No. 24200409.1, dated Feb. 25, 2025, 12 pages,.

* cited by examiner

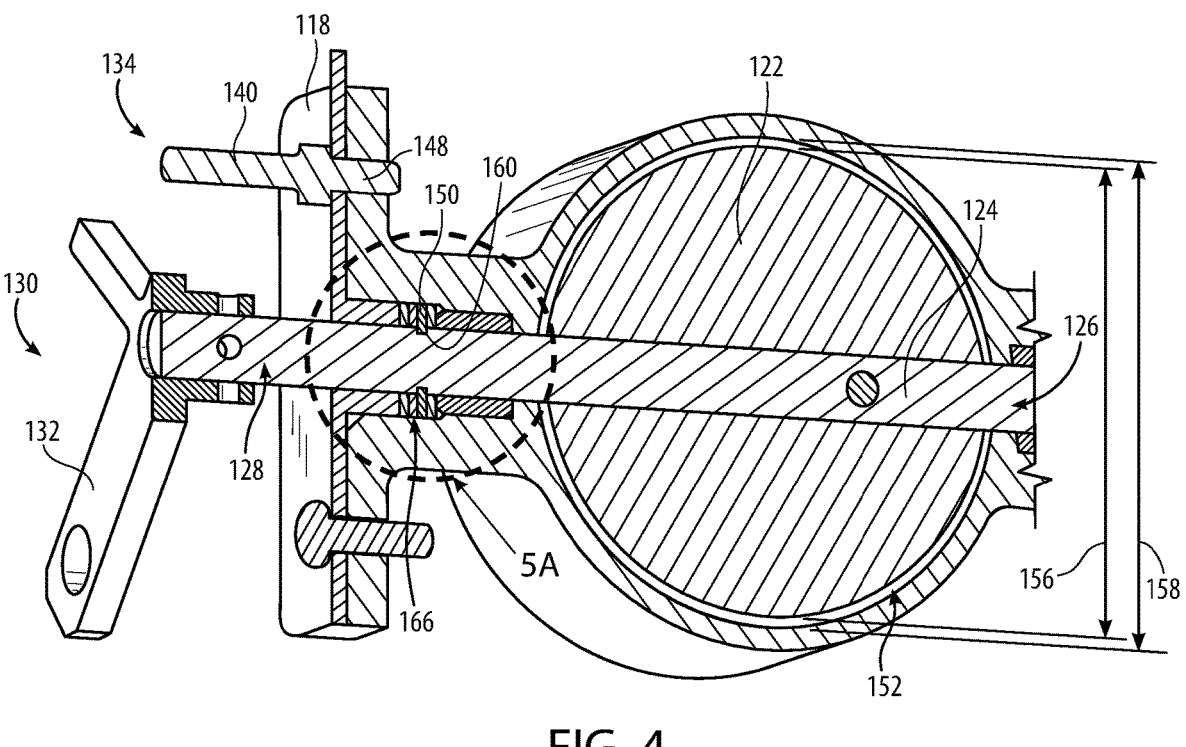
FIG. 4
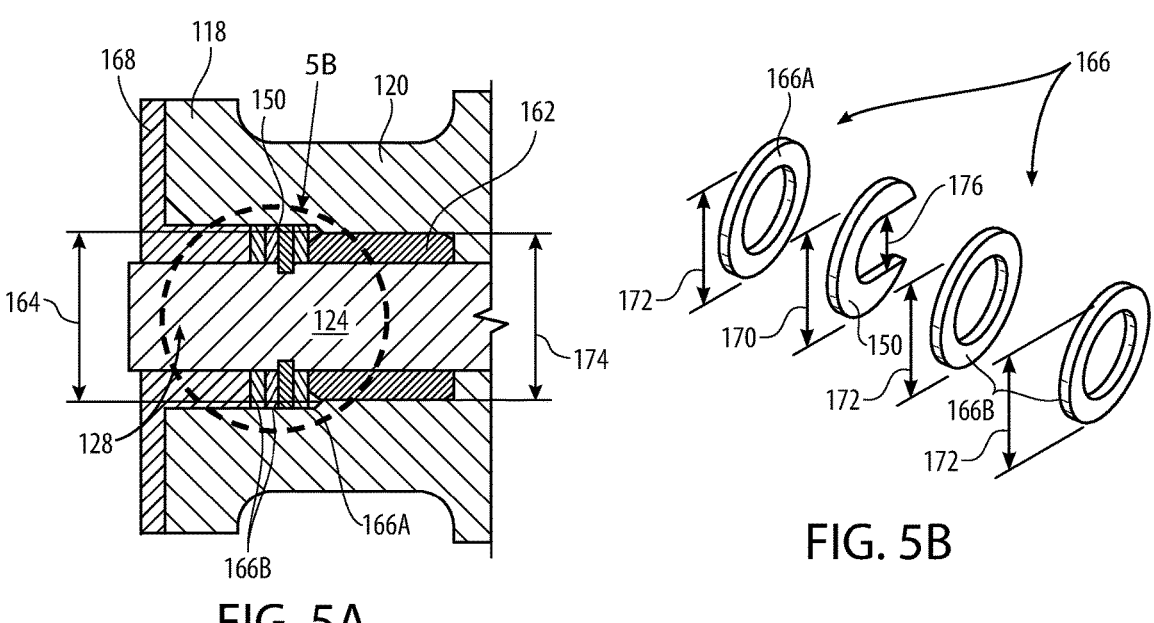
FIG. 5A
FIG. 5B

234

237

239

236    246    244

234    230

242

MODULAR AIR VALVE SYSTEM

STATEMENT OF GOVERNMENT RIGHTS

This invention was made with government support awarded by the United States Air Force. The government has certain rights in the invention.

TECHNICAL FIELD

The present disclosure relates to valves and more particularly to butterfly valves.

BACKGROUND

Typical air butterfly designs are custom, single bore configurations. Therefore, to achieve larger airflow volumes, the valve body needs to be made bigger, and a custom valve needs to be made for each application. Further, typical designs have a pressure loaded shaft that require thrust management, which can present challenges when attempting to design a new valve for a new application, or when increasing the size of the valve. This can also influence the alignment of the valve within the body, which should be maintained at a center of the valve body to avoid excessive wear on the valve.

The conventional techniques have been considered satisfactory for their intended purpose. However, there is an ever present need for improved valve systems and methods that can be multi-use. This disclosure provides a solution for this need.

SUMMARY

In accordance with at least one aspect of this disclosure, a modular valve system includes, at least a first valve. The first valve can be configured to connect to one or more additional valves. The first valve includes, a first housing having a first inlet and a first outlet with a cylindrical flow path through the housing defined between the first inlet and the first outlet along a flow axis, where a diametral plane is defined diametrically spanning the cylindrical flow path.

The first valve can include a mounting flange extending from the first housing at the first inlet or the first outlet configured to mount the first valve to a first structure (e.g., a fluid manifold). A first connecting flange extending from the first housing via a first housing extension in a first direction configured to connect the first valve to a second valve, and a second connecting flange extending from the first housing via a second housing extension in a second direction opposite the first direction configured to connect the first valve to a third valve or a second structure. In embodiments, the first connecting flange or the second connecting flange may not be connected to anything.

A first valve disc is mounted to a first shaft disposed within the first housing along a rotation axis for rotation between a first position of the first valve disc allowing a first flow amount through the cylindrical flow path and a second position of the first valve disc allowing a second flow amount through the cylindrical flow path. The first flow amount can be greater than the second flow amount, and in certain embodiments, the second flow amount can be zero.

A first end of the first shaft extends through the first housing extension and through the first connecting flange and is configured to connect to a second shaft of the second valve. A second end of the first shaft extends through the second housing extension and the second connecting flange and is configured to connect to a third shaft of a third valve or to a crank of the first valve.

In embodiments, the first valve can be symmetric about the rotation axis and can be symmetric about a vertical axis (e.g., bisecting the first valve housing. In embodiments, the symmetry of the first valve can be such that the first valve is configured to be reversible, for example wherein the first inlet can be a first inlet or a first outlet and the first outlet can be a first outlet or a first inlet.

In embodiments, the modular air valve system can include the second valve operatively connected to the first valve. The second valve can be the same or similar to the first valve, and can include a second housing having a second inlet and a second outlet with a cylindrical flow path defined through the housing between the second inlet and the second outlet, wherein a diametral plane is defined diametrically spanning the cylindrical flow path, The second valve can include a mounting flange extending from the second housing at the second inlet or the second outlet configured to mount the second valve to the first structure (e.g., the fluid manifold). The second valve can include a third connecting flange extending from the second housing via a third housing extension in a first direction configured to connect to the first connecting flange of the first valve in a daisy chain. A fourth connecting flange can extend from the second housing via a fourth housing extension in a second direction opposite the first direction configured to connect the second valve to a fourth valve a second structure.

A second valve disc is mounted to a second shaft disposed within the second housing along the rotation axis for rotation between a first position of the second valve disc allowing a first flow amount through the cylindrical flow path and a second position of the second valve disc allowing a second flow amount through the cylindrical flow path. In embodiments the first flow amount can be greater than the second flow amount, and in certain embodiments, the second flow amount can be zero.

A first end of the second shaft extends through the third housing extension and through the third connecting flange to connect to the first end of the first shaft of the first valve at a shaft interconnect region to rotate the first valve disc and the second valve disc together. A second end of the second shaft extends through the fourth housing extension and the fourth connecting flange and is configured to connect to a third shaft of a third valve or to a crank to drive rotation of the first valve disc and the second valve disc.

In embodiments, the shaft interconnect region can include the first and of the first shaft and the first end of the second shaft. In embodiments the first end of the first shaft and the first end of the second shaft are configured to couple with one another to rotationally lock the first shaft and the second shaft to one another such that the first shaft and the second shaft, and the first valve disc and the second valve disc rotate together along a common rotation axis.

In certain embodiments, the shaft interconnect region can include, on the first end of the first shaft, a recess configured to accept a locking protrusion, and on the first end of the second shaft, the locking protrusion configured to be inserted into the recess on first end of the first shaft. In certain embodiments, the recess can include a slot and the locking protrusion can include a tab configured to slide within the slot to rotationally lock the first shaft to the second shaft.

In embodiments, the shaft interconnect region can be disposed within an interior space defined by the first housing extension of the first valve and the third housing extension of the second valve. A bushing can be disposed partially on the first shaft and partially on the second shaft at the shaft interconnect region. The bushing can include a plurality of vents disposed circumferentially thereabout to allow for ambient venting between the interior space and an ambient environment, for example to pressure balance the first shaft and the second shaft.

When the first valve and the second valve are connected, a seam created by the interfacing of the first connecting flange of the first valve and the third connecting flange of the second valve can form a vent port for fluid communication between the interior space and the ambient environment through the vents of the bushing.

In embodiments, a first dynamic sealing member can be disposed at least partially within the first housing extension and extend onto a face of the second connecting flange of the first valve, and a second dynamic sealing member can be disposed at least partially within the fourth housing extension and extend onto a face of the fourth connecting flange of the second valve. When the first valve is connected to the second valve, no sealing member is disposed between the first connecting flange of the first valve and the third connecting flange of the second valve. In embodiments, if the first valve is not connected to a second valve, both the first connecting flange and the second connecting flange can each have sealing members. In embodiments, the sealing members can by dynamic sealing members.

In embodiments, a crank can be disposed on the second end of the first shaft axially outboard of the second connecting flange configured to rotate the first shaft, the first valve disc, the second shaft, and the second valve disc. The crank can include a crank arm configured to connect to a drive linkage and a crank stop configured to limit rotation of the crank to a predefined rotational quadrant of the first valve disc and the second valve disc within the housing to define the first position and the second position of the first and second valve discs based on an angle of the crank arm relative to the first and second valve disc.

In embodiments, the crank stop can be circumferentially aligned on the shaft relative to the rotation axis such that the crank arm rotates the first valve disc and the second valve disc within the predefined rotational quadrant such that if one of the first valve or second valve is mounted to the first structure incorrectly, the crank stop will prevent the crank arm from connecting to the drive linkage.

In accordance with at least one aspect of this disclosure, a shaft interconnect system of a modular valve configured connect a first shaft of a first valve to a second shaft of a second valve for rotation of the first shaft and second shaft together along a common rotation axis, can include, a first shaft having a first end and a second end. The first end can include a recess and a slot extending along a surface of the first shaft along the recess. The second shaft can have a first end and a second a second end and the first end can include a locking protrusion configured to be inserted into the recess of the first end of the second shaft. In certain embodiments, the locking protrusion can include a tab extending away from the locking protrusion in a direction other than parallel to the common rotation axis configured to slide into the slot to rotationally lock the first shaft and the second shaft together for rotation about the common rotation axis.

The shaft interconnect system can include a first valve disc mounted to the first shaft and a second valve disc mounted to the second shaft. Rotation of the first shaft and the second shaft rotates the first valve disc and the second valve disc together and by the same amount. In embodiments, a crank can be disposed on a second end of the first shaft can be configured to connect to a drive linkage to drive the first shaft and the second shaft to rotate about the rotation axis. In embodiments, the second end of the second shaft can be configured for interconnection with a third shaft having a third valve disc thereon.

In accordance with at least one aspect of this disclosure, a bushing for providing a porting means to an interconnected valve system can include a bushing body having a first end opening configured to receive a first end of a first shaft and a second end opening configured to receive a first end of a second shaft such that the first shaft and the second shaft connect to one another within the bushing body. The bushing can also include a plurality of venting holes defined through the bushing body and disposed circumferentially about the bushing body configured to provide a vent flow path through the bushing body to an ambient environment external to the bushing body.

In embodiments, the bushing is configured to be inserted into interior space of an interconnected valve system housing at a shaft interconnect region of the first shaft and the second shaft, and the venting holes of the bushing can be configured to fluidly communicate the interior space of the interconnected valve system housing to the ambient environment to pressure balance the first shaft and the second shaft.

In accordance with at least one aspect of this disclosure, a valve system can include, a first valve configured to connect to one or more additional valves, e.g., in a daisy chain configuration. The first valve can include, a first housing having a first inlet and a first outlet with a cylindrical flow path defined through the housing between the first inlet and the first outlet along a flow axis. A diametral plane is defined diametrically spanning the cylindrical flow path.

The first valve can include a first connecting flange extending from the first housing via a first cylindrical housing extension in a first direction configured to connect the first valve to a second valve and a second housing flange extending from the first housing via a second housing extension in a second direction opposite the first direction configured to connect the first valve to a third valve or connect the first valve to a first structure. In embodiments, the first and second connecting flanges may not connect to anything.

The first valve can include a first valve disc mounted to a first shaft disposed within the first housing along a rotation axis for rotation between a first position of the first valve disc allowing a first flow amount through the cylindrical flow path and a second position of the first valve disc allowing a second flow amount through the cylindrical flow path.

In embodiments, a second end of the first shaft can extend through the second housing extension and the second connecting flange and can be configured to connect to a crank of the first valve. The crank can be disposed on the second end of the first shaft axially outboard of the second connecting flange configured to rotate the first shaft and the first valve disc. In embodiments, the crank can include a crank arm configured to connect to a drive linkage and a crank stop configured to limit rotation of the crank to a predefined rotational quadrant of the first valve disc within the housing to define a the first position of the first valve disc based on an angle of the crank arm relative to the first valve disc.

The first valve can include a first mounting flange extending from the first housing at the first inlet and the first outlet configured to mount the first valve to a second structure to fluidly communicate a flow path of the second structure with the first valve.

In embodiments, the crank stop can be circumferentially aligned on the first shaft relative to the rotation axis to allow the crank arm to rotate the first valve disc within the predefined rotational quadrant and such that if the first valve is mounted to the second structure incorrectly, the crank stop will prevent the crank arm from connecting to the drive linkage. In embodiments, the crank stop can be clocked to the predefined rotational quadrant such that if the valve is mounted to the second structure incorrectly, the crank arm will be unable to connect to the drive linkage.

In certain embodiments, the crank arm can extend radially outward from the first shaft, and the crank stop can include one or more protrusions extending from the crank arm configured to contact a portion of the second connecting flange of the first valve to physically limit rotation of the crank to the predefined rotational quadrant.

In certain embodiments, the crank can include a sleeve portion disposed over the second end of the first shaft. The sleeve portion can include a first securing hole and a second securing hole configured to receive a fastener to secure the crank to the second end of the first shaft. A rotational location (e.g., a circumferential position) of the first securing hole and second securing hole on a circumference of the first shaft is configured to clock the crank arm within the predefined rotational quadrant.

In certain embodiments, the crank arm can extend radially outward from the first shaft and, in certain embodiments, the crank stop can include a first leg and a second leg extending radially outward from the first shaft, co-planar with the crank arm. A pin can be disposed in the second connecting flange extending axially from the second connecting flange towards the crank and the first leg and the second leg can be configured to contact the pin to physically limit rotation of the crank to the predefined rotational quadrant.

The crank can include a sleeve portion disposed over the second end of the first shaft, and the sleeve portion can include a first securing hole and a second securing hole configured to receive a fastener to secure the crank to the second end of the first shaft. A rotational location (e.g., circumferential position) of the first securing hole and second securing hole on a circumference of the first shaft is configured to clock the crank within a first quadrant or a second quadrant and a pin location on the second securing flange is configured to clock the crank within a third or fourth quadrant to set the predefined rotational quadrant.

In embodiments, the system can include a second valve, the second valve including a second housing having a second inlet and a second outlet with a cylindrical flow path defined between the second inlet and the second outlet, where a diametral plane is defined diametrically spanning the cylindrical flow path.

The second valve can include a third connecting flange extending from the second housing via a third cylindrical housing extension in a first direction configured to connect to the first housing flange of the first valve in a daisy chain and a fourth housing flange extending from the second housing via a fourth cylindrical housing extension in a second direction opposite the first direction configured to connect the second valve to a fourth valve or connect the second valve to a drive linkage.

A second valve disc can be mounted to a second shaft disposed within the second housing along the rotation axis for rotation between a first position of the second valve disc allowing a first flow amount through the cylindrical flow path and a second position of the second valve disc allowing a second flow amount through the cylindrical flow path. In embodiments, the first flow amount can be greater than the second flow amount. In certain embodiments, the second flow amount can be zero.

In embodiments, a first end of the second shaft can extend through the third housing extension and through the third connecting flange and can be configured to connect to the first end of the first shaft of the first valve at a shaft interconnect region to rotate the first valve disc and the second valve disc together. A second end of the second shaft can extend through the fourth housing extension and the fourth connecting flange and can be configured to connect to a fourth shaft of the fourth valve.

In embodiments, the crank stop can be configured to limit rotation of the crank to a predefined rotational quadrant of the first valve disc and the second valve disc within the housing to define a the first position and the second position of the first and second valve discs based on an angle of the crank arm relative to the first and second valve disc.

A second mounting flange can extend from the second housing at the second inlet or the second outlet configured to mount the second valve to the second structure to fluidly communicate a second flow path of the second structure with the second valve. In embodiments, the second structure is a fluid manifold.

In certain embodiments, the crank stop can be circumferentially aligned on the shaft relative to the rotation axis such that the crank arm rotates the first valve disc and the second valve disc within the predefined rotational quadrant such that if one of the first valve or second valve is mounted to the second structure incorrectly, the crank stop will prevent the crank arm from connecting to the drive linkage. The crank stop can be clocked to the predefined rotational quadrant such that if one of the first valve or the second valve is mounted to the second structure incorrectly or if the second valve is mounted to the first valve incorrectly, the crank arm will be unable to connect to the drive linkage. In embodiments, the predefined rotational quadrant of the first valve disc and the second valve disc can be determined at least in part as a function of a total number of valves in the daisy chain. In embodiments, the crank is included on a terminal valve of the daisy chain.

In embodiments, the valve system can include a sealing member disposed at least partially in the first housing extension, extending axially from the first connecting flange into the cylindrical housing extension.

In accordance with at least one aspect of this disclosure, a limiting system for defining a rotational limit of a valve disc of a butterfly valve can include, a crank configured to be disposed on a terminal end of a valve shaft and configured to connect to a drive linkage to drive the crank and rotation of the valve disc. The crank can include a crank arm extending radially outward from the shaft. The crank stop can be configured to contact a portion of the second connecting flange of the first valve to physically limit rotation of the crank and the valve disc within a predefined rotational quadrant.

In certain embodiments, the crank stop can include one or more protrusions extending from the crank arm configured to contact a portion of a connecting flange of the butterfly valve to physically limit rotation of the crank to the predefined rotational quadrant. In certain such embodiments, the crank can include a sleeve portion configured to be disposed over the terminal end of the shaft. The sleeve portion can include a first securing hole and a second securing hole configured to receive a fastener to secure the crank to the terminal end of the shaft. A rotational location (e.g., a circumferential position) of the first securing hole and second securing hole on a circumference of the shaft can be configured to clock the crank within the predefined rotational quadrant.

In certain embodiments, the crank stop can include a first leg and a second leg extending radially outward from the first shaft, co-planar with the crank arm. The crank arm can also include, a pin configured to be disposed in a connecting flange of the butterfly valve extending axially from the connecting flange towards the crank. In the valve assembly, the first leg and the second leg are configured to contact the pin to physically limit rotation of the crank to the predefined rotational quadrant.

In certain such embodiments, the crank can include a sleeve portion configured to be disposed over the terminal end of the shaft. The sleeve portion can include a first securing hole and a second securing hole configured to receive a fastener to secure the crank to the terminal end of the shaft. A rotational location (e.g., circumferential position) of the first securing hole and second securing hole on a circumference of the first shaft is configured to clock the crank within a first quadrant or a second quadrant and a pin location on the securing flange clocks the crank within a third or fourth quadrant to set the predefined rotational quadrant.

In embodiments, the crank stop can be circumferentially aligned on the shaft relative to the rotation axis such that the crank arm rotates the valve disc within the predefined rotational quadrant such that if the butterfly valve is mounted to a structure incorrectly, the crank stop will prevent the crank arm from connecting to the drive linkage. The crank stop can be clocked to the predefined rotational quadrant such that if the valve is mounted to the second structure incorrectly, the crank arm will be unable to connect to the drive linkage.

In accordance with at least one aspect of this disclosure, a valve system can include a first valve configured to connect to one or more additional valves, where the first valve includes, a first housing having a first inlet and a first outlet with a cylindrical flow path defined between the first inlet and the first outlet along a flow axis, and where a diametral plane is defined diametrically spanning the cylindrical flow path.

A first connecting flange can extend from the first housing via a first housing extension in a first direction configured to connect the first valve to a second valve and a second housing flange can extend from the first housing via a second housing extension in a second direction opposite the first direction configured to connect the first valve to a third valve or a connect the first valve to a structure.

A first valve disc is mounted to a first shaft disposed within the first housing along a rotation axis for rotation between a first position of the first valve disc allowing a first flow amount through the cylindrical flow path and a second position of the first valve disc allowing a second flow amount through the cylindrical flow path. A first end of the first shaft can extend through the first housing extension and through the first connecting flange. A first retaining clip can be disposed on the first shaft at a location on the first shaft axially within the second housing extension configured to axially retain the valve disc within the valve housing, for example, centered within the housing.

A groove can be formed in the first shaft to receive the first retaining clip therein. In certain embodiments, the first retaining clip can be a c-shaped retaining clip. A first shaft bushing can be disposed on the first shaft, and the first retaining clip is disposed on the shaft axially outboard of the bushing.

In embodiments, the system can include a first plurality of shims, and the first retaining clip can be axially separated from the first bushing by at least one shim of the first plurality of shims.

In embodiments, a sealing member can be disposed at least partially within the first housing extension and can extend onto a face of the second connecting flange of the first valve. The first shaft can extend through the first housing extension and through the sealing member to connect to a crank. In certain embodiments, at least one shim of the first plurality of shims can be disposed on the shaft axially between the shaft retaining clip and the sealing member.

In embodiments, a diameter of the retaining clip can be greater than a diameter of the bushing. In embodiments, an outer diameter of the retaining clip can contact an inner diameter of the housing extension. In embodiments, an inner diameter of the retaining clip can be configured to provide loose low clearance fit relative to the first shaft such that the first shaft rotates within the retaining clip while the retaining clip remains rotationally stationary.

In embodiments, the first end of the first shaft can extend through the first housing extension and through the first connecting flange and is configured to connect to a second shaft of the second valve. A second end of the first shaft can extend through the second housing extension and the second connecting flange and is configured to connect to a third shaft of a third valve or to the crank of the first valve.

In embodiments, the system can further include the second valve and the second valve can include a second housing having a second inlet and a second outlet with a cylindrical flow path defined between the second inlet and the second outlet, where a diametral plane is defined diametrically spanning the cylindrical flow path.

The second valve can include, a third connecting flange extending from the second housing via a third housing extension in a first direction configured to connect to the first housing flange of the first valve in a daisy chain and a fourth connecting flange extending from the second housing via a fourth housing extension in a second direction opposite the first direction configured to connect the second valve to a third valve or connect the second valve to a second structure.

The second valve can include a second valve disc mounted to a second shaft disposed within the second housing along the rotation axis for rotation between an first position of the second valve disc allowing a first flow amount through the cylindrical flow path and a second position of the second valve disc blocking a second flow amount through the cylindrical flow path.

In embodiments, a first end of the second shaft can extend through the third housing extension and through the third connecting flange and can be configured to connect to the first end of the first shaft of the first valve at a shaft interconnect region to rotate the first valve disc and the second valve disc together. A second end of the second shaft can extend through the fourth housing extension and the fourth connecting flange and can be configured to connect to a third shaft of a third valve or to the crank. In certain embodiments, the second end of the second valve and the fourth connecting flange may not be connected to anything.

The second valve can include a second retaining clip disposed on the second shaft at a location on the second shaft axially within the fourth housing extension. The first retaining clip can be configured to axially retain the first valve disc within the first valve housing and the second retaining clip can be configured to axially retain the second valve disc within the second valve housing, for example so that both the first valve disc and the second valve disc remain centered within their respective valve housings.

A first groove can be formed in the first shaft to receive the first retaining clip therein and a second groove can be formed in the second shaft to receive the second retaining clip therein. In embodiments, the first retaining clip and the second retaining clip can both be a c-shaped retaining clip.

In accordance with at least one aspect of this disclosure, a retaining clip system for retaining an alignment of a valve disc within a valve housing can include, a c-shaped retaining clip configured to be disposed on a shaft of the valve and a shim pack including a plurality of shims configure to axially bound the retaining clip on the shaft.

In embodiments, a first shim of the shim pack can be configured to set the alignment of the valve disc within the valve housing and the retaining clip can be configured to retain the alignment of the valve disc set by the first shim. At least a second shim of the shim pack can be configured to remove axial end play of the shaft within the valve housing. The retaining clip can be configured to maintain a centered alignment of the valve disc within the valve housing.

In embodiments, an inner diameter of the retaining clip can be configured to provide loose low clearance fit relative to the shaft such that the shaft is able to rotate within the retaining clip while the retaining clip is configured to remain rotationally stationary.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein:

FIG. 4A is a partial cross-sectional view of the modular air valve of FIG. 1 taken along line 4-4, showing a retaining clip system;

FIG. 5A is an enlarged partial cross-sectional view of the modular air valve shown in FIG. 4, showing the retaining clip system;

FIG. 5B is an exploded perspective view of the retaining clip system, showing a retaining clip and a plurality of shims;

DETAILED DESCRIPTION

Figure 1:
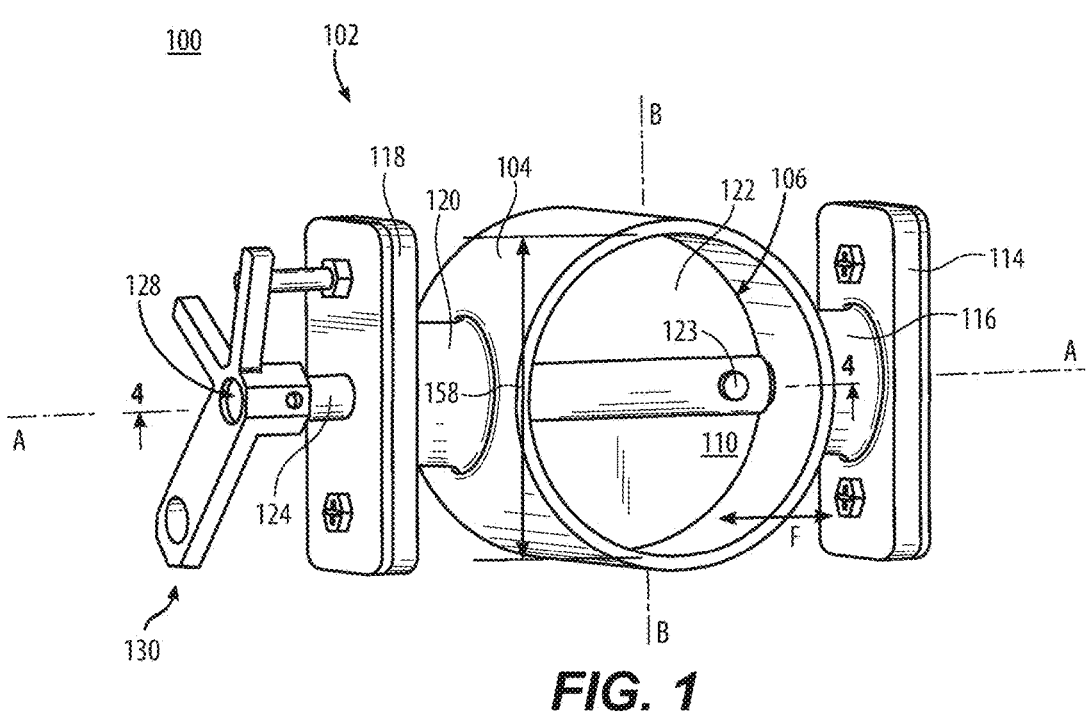
FIG. 1 is a perspective view of an embodiment of a singular modular air valve in accordance with this disclosure.

Reference will now be made to the drawings wherein like reference numerals identify similar structural features or aspects of the subject disclosure. For purposes of explanation and illustration, and not limitation, an illustrative view of an embodiment of a valve system in accordance with the disclosure is shown in FIG. 1 and is designated generally by reference character 100. Other embodiments and/or aspects of this disclosure are shown in FIGS. 2-9B. Certain embodiments described herein include a modular valve system (e.g., a modular air valve), wherein one or more valves of the modular air valve system can be connected to one another to form a larger valve assembly, and or such that one valve may be used in more than one application without redesign or reconstruction of the valve.

Figure 2:
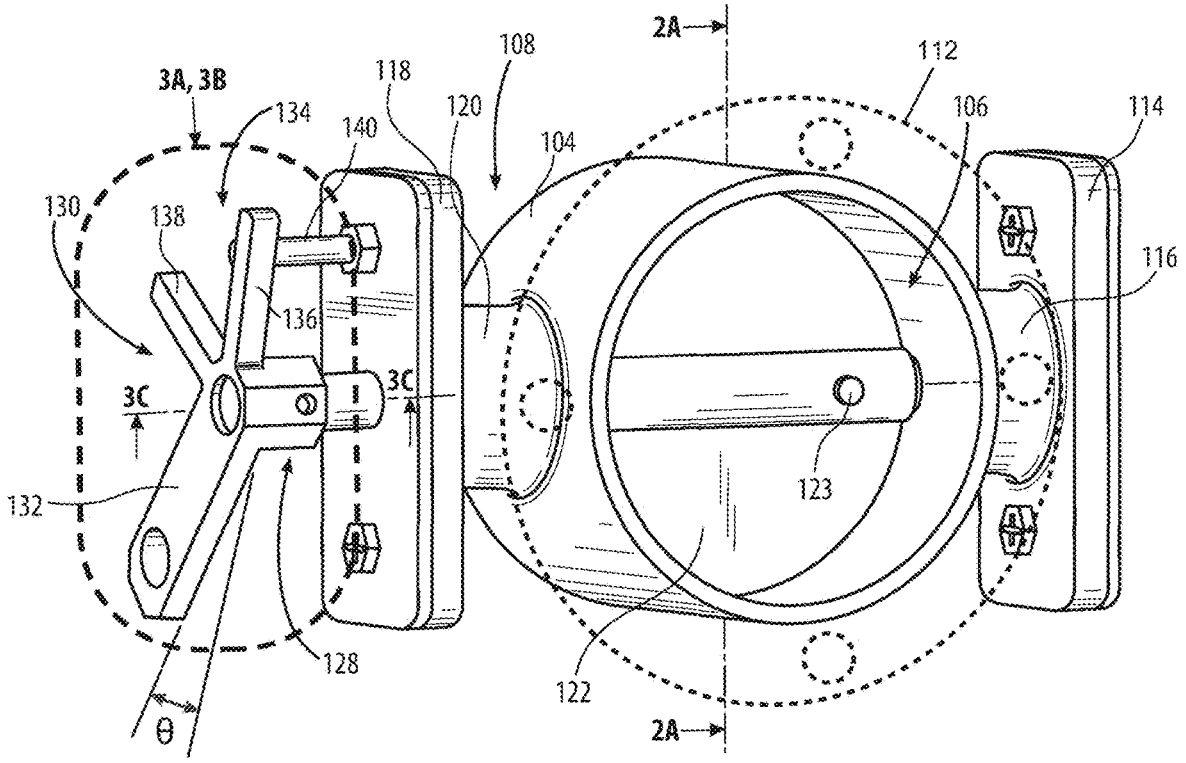
FIG. 2 is a perspective view of the modular air valve of FIG. 1, showing a crank system of the modular air valve.
Figure 2A:
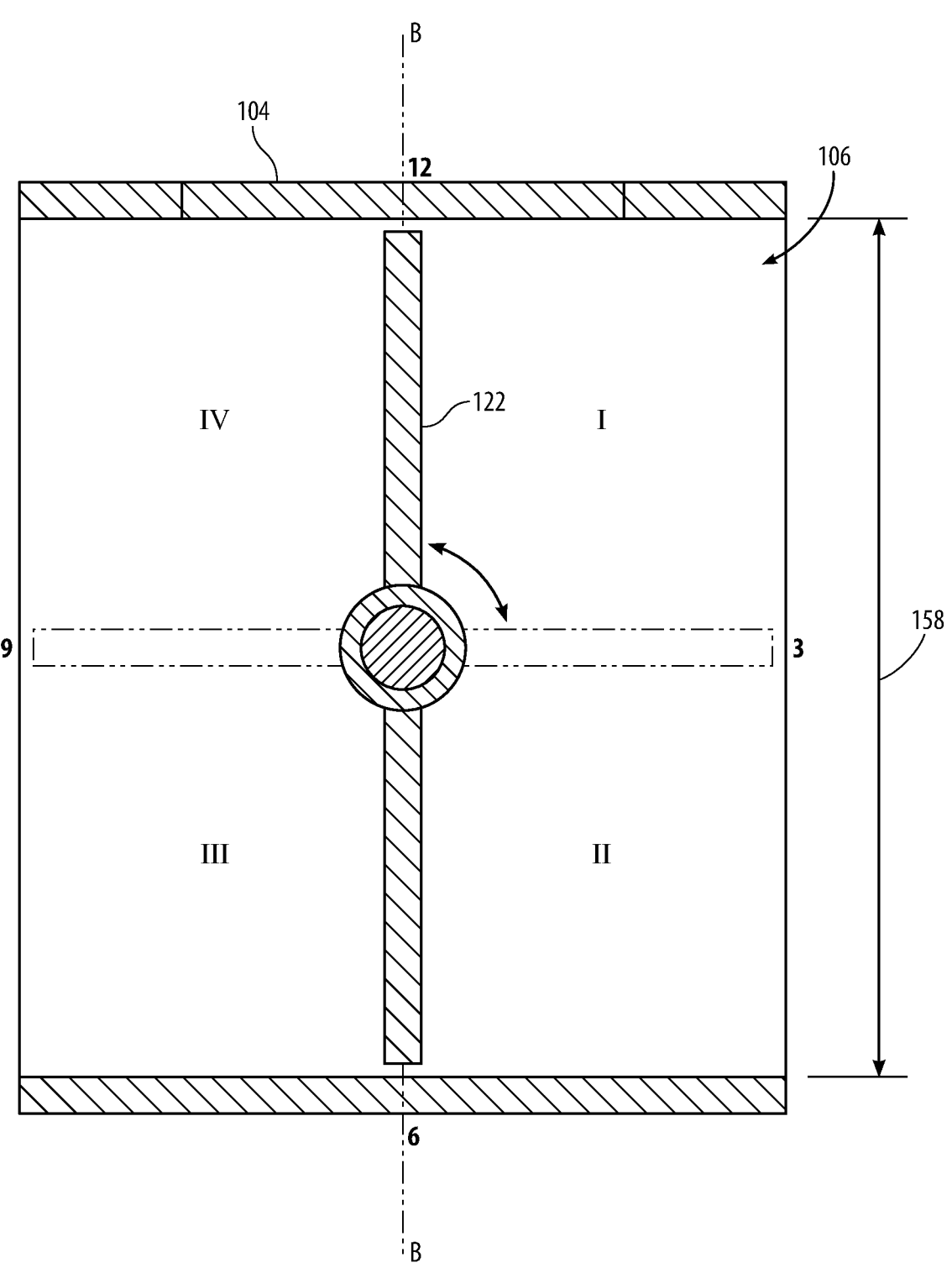
FIG. 2A is a cross sectional view of the modular air valve of FIG. 2, taken along line 2A-2A.
Figure 6:
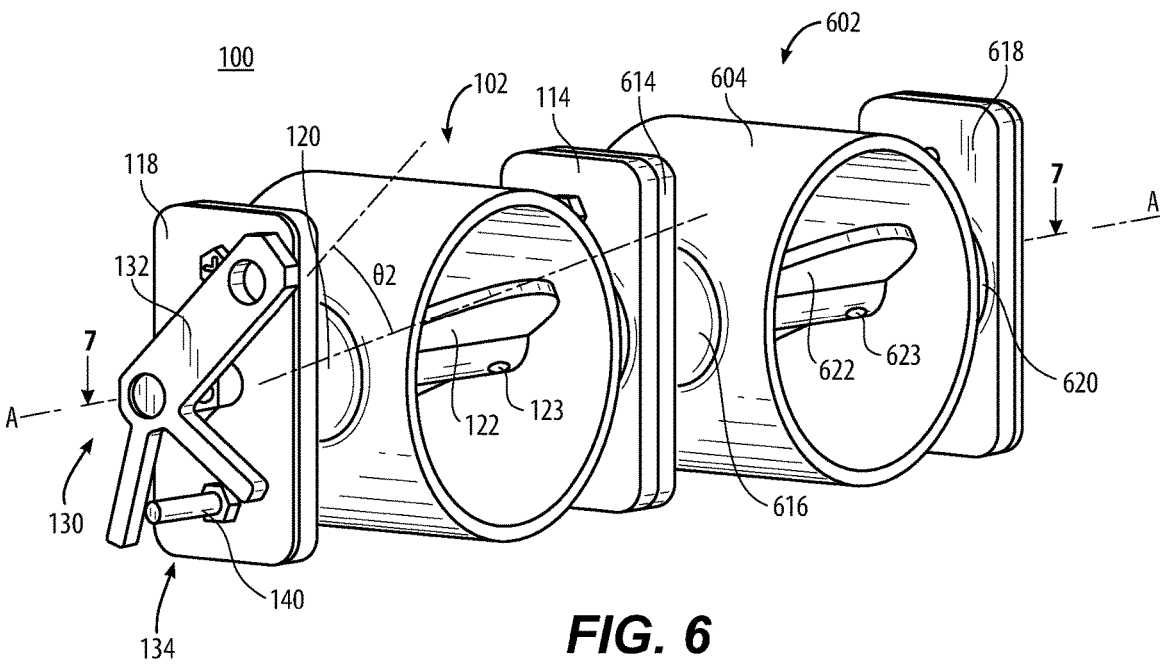
FIG. 6 is a perspective view of an embodiment of a modular air valve system, having two modular air valves connected to one another.

With reference to FIGS. 1 and 2, in accordance with at least one aspect of this disclosure, a modular valve system 100 can include, at least a first valve 102. The first valve 102 can be configured to connect to one or more additional valves 602 (e.g., in a larger capacity assembly as shown in FIG. 6 and described further below). The first valve 102 includes a first housing 104 having a first inlet 106 and a first outlet 108 with a cylindrical flow path 110 through the housing 104 defined between the first inlet 106 and the first outlet 108 along a flow axis F (into and out of the page in FIGS. 1 and 2), where a diametral plane is defined diametrically spanning the cylindrical flow path 110.

The first valve 102 can include a mounting flange 112 extending from the first housing 104 at the first inlet 106 or the first outlet 108 configured to mount the first valve 102 to a first structure (e.g., a fluid manifold). The first valve 102 can also include a second mounting flange (not shown) opposite the valve housing the first mounting flange 112 for connecting the valve 102 to a fluid conduit for directing the flow at the outlet 110 of the first valve.

A first connecting flange 114 extends from the first housing 104 via a first housing extension 116 in a first direction configured to connect the first valve 102 to a second valve (e.g., the second valve 602). A second connecting flange 118 extends from the first housing via a second housing 120 extension in a second direction opposite the first direction configured to connect the first valve 102 to a third valve or a second structure. However, in embodiments, the first connecting flange 114 or the second connecting flange 116 may not be connected to anything in practice.

A first valve disc 122 is mounted (e.g., fixedly mounted) to a first shaft 124 disposed within the first housing 104 along a rotation axis A for rotation between a first position of the first valve disc 122 allowing a first flow amount through the cylindrical flow path 110 and a second position of the first valve disc 122 allowing a second flow amount through the cylindrical flow path 110. The first flow amount can be greater than the second flow amount, and in certain embodiments, the second flow amount can be zero. For example, the first position can define a fully open position where the first flow amount passes through the valve, and the second position can define a fully closed position where no flow passes through the valve. In certain embodiments, the first position can define a first open position where a maximum amount of flow passes through the valve, and the second position can define a second open position that is less open than the first open position so less than maximum flow passes through the valve, but greater than no flow.

A first end 126 of the first shaft 124 extends through the first housing extension 116 and through the first connecting flange 114 and can be configured to connect to a second shaft 624 of the second valve 602. A second end 128 of the first shaft 124 extends through the second housing extension 120 and the second connecting flange 118 and is configured to connect to a third shaft of a third valve or to a crank 130, which drives the valve disc 122 between the first position and the second position. In FIGS. 1-4, the first end 126 of the first shaft 124 is shown not connected to anything, and instead housed within the first housing extension 116 (and is obscured by the housing extension 116), and the second end 128 of the first shaft 124 is shown connected to the crank 130.

In embodiments, e.g., as shown, the first valve 102 can be symmetric about the rotation axis A and can be symmetric about a vertical axis B (e.g., bisecting the first valve housing 104 when the crank 130 is not connected to the first valve 102. In embodiments, the symmetry of the first valve 102 can be such that the first valve is configured to be reversible, for example wherein the first inlet 106 can be a first inlet 106 or a first outlet 108 and the first outlet 108 can be a first outlet 108 or a first inlet 106. In other words, the valve 102 can be rotated 180° about the vertical axis B or the rotational axis A for installation in multiple different specific applications. The crank 130, as discussed below, will set the particular configuration for the valve 102 for the given application for assembly proofing the valve 102. Having the valve be symmetrical allows for a single valve design to be used for multiple applications, and also allows for stringing valves together as needed to achieve a desired flow for the given application.

Figures 3A, 3B, 3C:
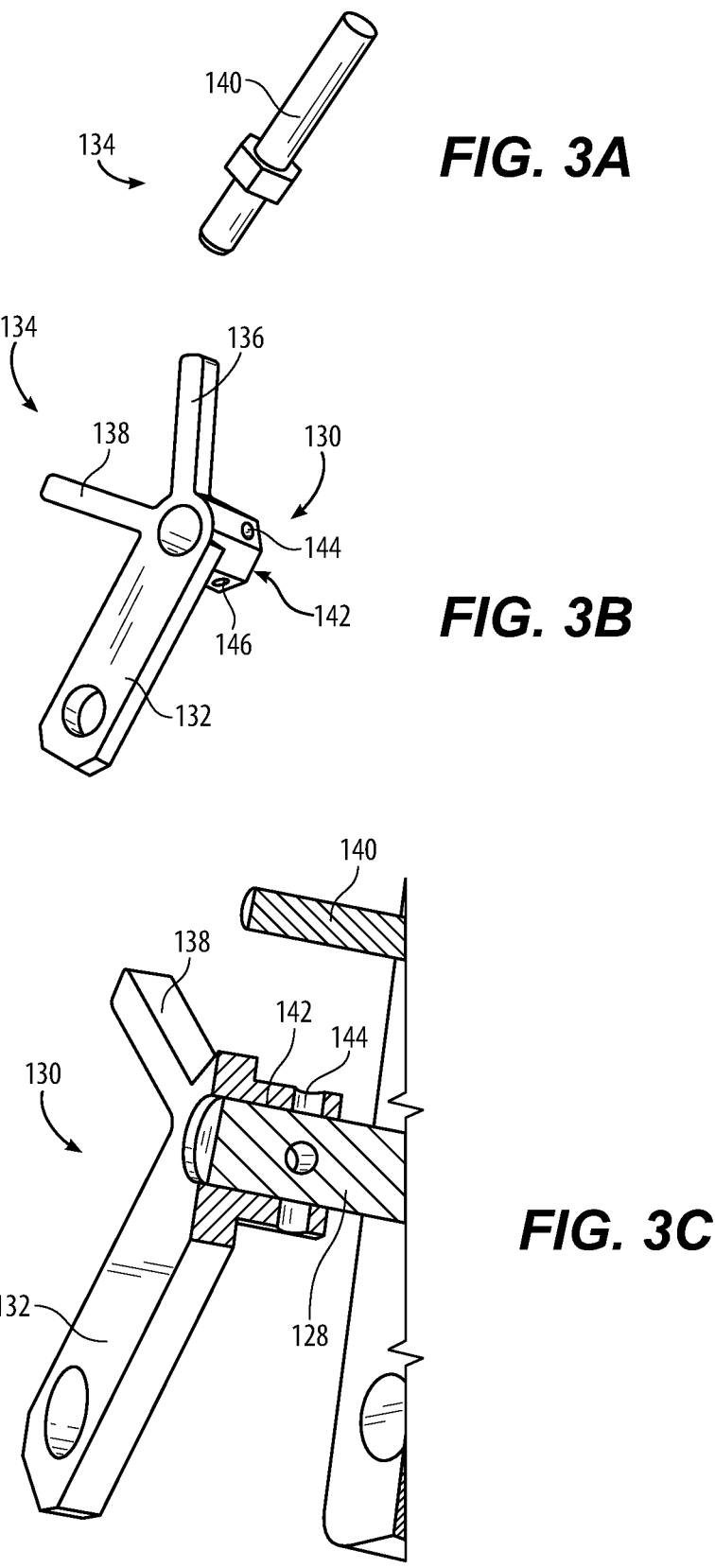
FIG. 3A is a perspective view of a guide pin of an embodiment of a crank stop of the crank system of FIG. 2.
FIG. 3B is a perspective view of the crank system.
FIG. 3C is a partial cross-sectional view of the crank system shown in FIG. 2 taken along the line 3C-3C.

Referring now to FIGS. 2-3C, the second end 128 of the first shaft 124 can extend through the second housing extension 120 and the second connecting flange 118 and can connect to the crank. 130. As shown, the crank 130 can be disposed on the second end 128 of the first shaft 124 axially outboard of the second connecting flange 118 and can be configured to drive rotation the first shaft 124 and the first valve disc 122 via a drive linkage (not shown). In embodiments, the crank 130 can include a crank arm 132 configured to connect to the drive linkage and a crank stop 134 configured to limit rotation of the crank 130 to a predefined rotational quadrant of the first valve disc 122 within the housing 102 to define the first position of the first valve disc 122 and the second position of the first valve disc 122 based on an angle θ1 of the crank arm 132 relative to the first valve disc 122.

The crank 130 can be placed on the first shaft 124 during assembly based on application specific specifications, for example, as a function of the desired first position and second position of the first valve disc 122. As shown in FIG. 2 for example, the valve disc 122 is shown in a fully closed position, so no flow is permitted from flowing through the valve. In FIG. 2, the valve disc 122 can be said to be at a 12 o'clock position, while the crank arm 132 can be angled relative thereto and placed at a 7 or 8 o'clock position. In this configuration, driving the crank 130 will allow the valve to move between the fully closed position to an open position where the valve disc will move to a 3 o'clock position and the crank arm 132 will move to a 9 o'clock position. The first position and the second position of the valve disc 122 will be defined herein as the bounds of a "rotational quadrant" of the valve disc 122. The predefined rotational quadrant of the valve disc 122 can be determined as a function of the given application for which the valve will be used and/or as a function of a number of valves in the valve assembly. The predefined rotational quadrant of the valve disc 122 is set based on a clocking position, or the circumferential position of the crank 130 on the first shaft 124.

For example, in embodiments, the crank stop 134 can be circumferentially aligned on the first shaft 124 relative to the rotation axis to such that the crank arm 130 rotates the first valve disc 122 within the predefined rotational quadrant. The crank stop provides assembly proofing for the valve 102 because, based on the clocking of the crank on the shaft, if the first valve 102 is mounted to the fluid manifold incorrectly (e.g., upside down or backwards), the crank stop 134 will prevent the crank arm 132 from being able to connect to the drive linkage of the existing system. If taking the example shown in FIG. 2, if the valve shown in FIG. 2 were rotated 180° about the rotational axis A from the orientation as shown in FIG. 2 before mounting to the manifold, the crank arm 132 would travel within in a different rotational quadrant (e.g., an opposite quadrant as predefined) and therefore be out of reach of the drive linkage. Accordingly, the only way for the crank arm 132 to connect to the drive linkage is to install the valve 102 in the correct orientation relative to the fluid manifold.

With continued reference to FIGS. 2-3C, the crank arm 132 can extend radially outward from the first shaft 124 and, in certain embodiments, the crank stop can include a first leg 136 and a second leg 138 extending radially outward from the first shaft 124, co-planar with the crank arm 132. A pin 140 can be disposed in the second connecting flange 118 extending axially from the second connecting flange 118 towards the crank 130. The first leg 136 and the second leg 138 can be configured to contact the pin 140 to physically limit rotation of the crank 130, and thereby the valve disc 122, to the predefined rotational quadrant.

The crank 130 can include a sleeve portion 142 disposed over the second end 128 of the first shaft 124. The sleeve portion 142 can include a first securing hole 144 and a second securing hole 146 configured to receive a fastener (not shown) to secure the crank 130 to the second end 128 of the first shaft 124. A circumferential position of the first securing hole 144 and second securing hole 146 on a circumference of the first shaft 124 will set the clocking of the crank arm 132 relative to the valve disc 122. This first clocking step will place the crank arm 132 and the valve disc 122 within a first quadrant and a second quadrant or a third quadrant or a fourth quadrant. In a second clocking step, the pin 140 will be placed in a fastener hole 148 on the second connecting flange 118. The pin location on the second securing flange 118, e.g., in the top location or bottom location shown in FIG. 2, will clock the crank within the first and third quadrant or the second or fourth quadrant to set the predefined rotational quadrant of the valve disc. For example, taking the example of FIG. 2 as described above, securing the crank 130 to the shaft 124 in the first clocking step will set the clocking of the crank to rotate between 12 o'clock and 6 o'clock, or between 6 o'clock and 12 o'clock. In the second clocking step, placing the pin 140 in the top location will set the rotational quadrant of the valve disc 122 to be between 12 o'clock and 3 o'clock, while placing the pin 140 in the bottom location will set the rotational quadrant of the valve disc 122 to be between 3 o'clock and 6 o'clock.

In another example, rotating the circumferential position of the crank 130 on the shaft 124 90° into the page and securing the crank 130 to the shaft in the first clocking step will set the clocking of the crank to rotate between 12 o'clock and 6 o'clock, or between 6 o'clock and 12 o'clock. Then, in the second clocking step, placing the pin 140 in the upper location will set the rotational quadrant of the valve disc to be between 9 o'clock and 12 o'clock, while selecting the lower pin location will set the rotational quadrant of the valve disc to be between 6 o'clock and 9 o'clock.

Figure 5C:
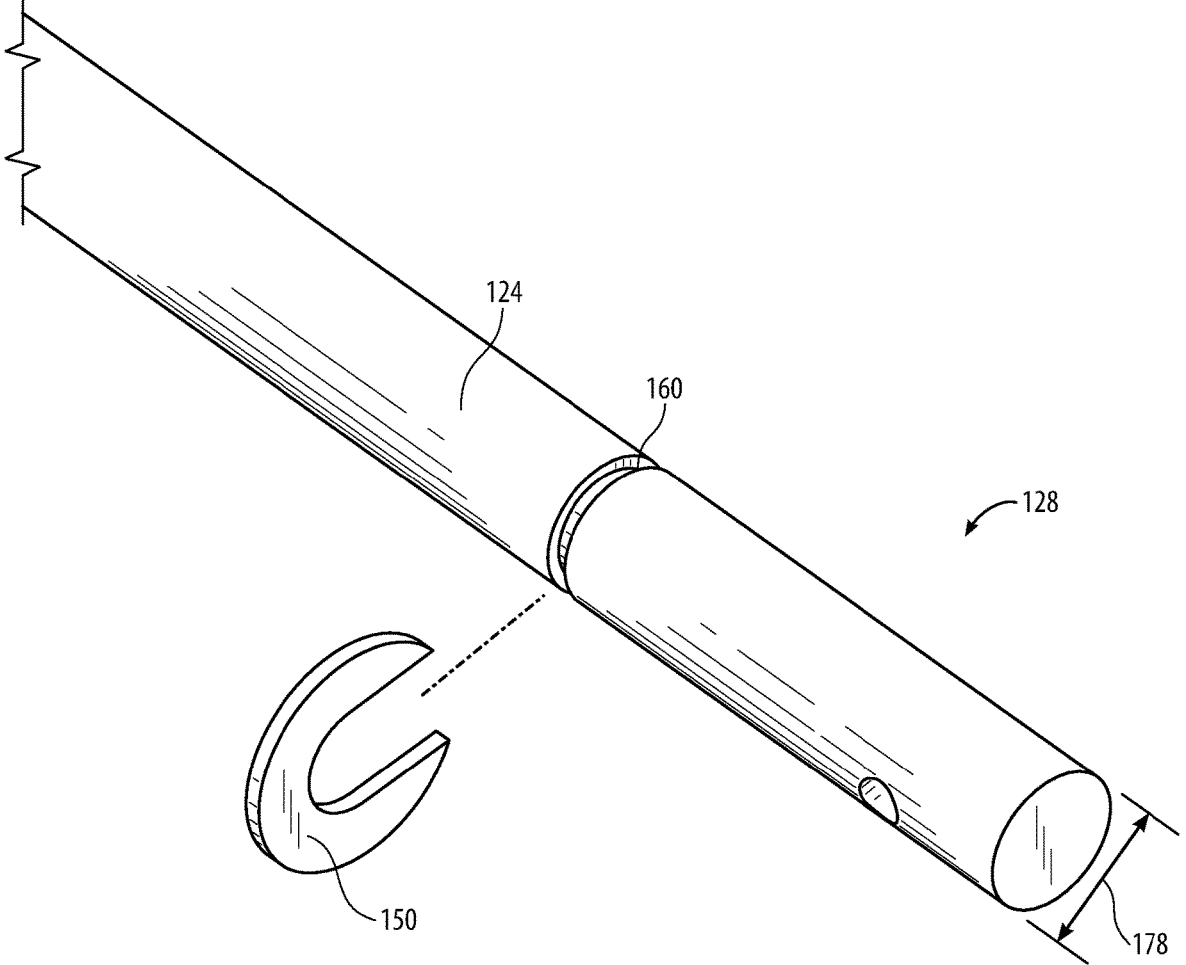
FIG. 5C is an enlarged exploded view of a shaft of the modular air valve and the retaining clip.

With reference now to FIGS. 4-5C, the disc 122 can be physically retained to the shaft 124 by a pin 123. The pin 123 locks the disc 122 to the shaft 124 in order to assure the disk 122 follows the shaft 122 rotational input. Also on the second end 128 of the first shaft 124, the first valve 102 can include a first retaining clip 150. The first retaining clip 150 can be disposed on the first shaft 124 at a location on the first shaft 124 axially within the second housing extension 120 configured to axially retain the valve disc 122 within the valve housing 104, for example, centered within the housing 104. The retaining clip 150 axially secures the shaft 124 to allow centering of the disc 122 via shims 166b. Once centered the outboard shims 166a are sized to control the endplay between the dynamic seal 168 and the retaining clip 150. "Endplay" is axial motion allowed based on application.

When the valve disc 122 is centered within the housing, a small gap 152 will be formed between an outer diameter 154 of the valve disc and an inner diameter 158 of the valve housing 104. If the valve disc 122 is not centered, this gap 152 will be larger on one side than the other and can cause contact between the valve disc 122 and the valve housing 104 on the side of the housing 104 opposite the enlarged gap. The contact between the valve disc 122 and the valve housing 104 can increase friction during rotation of the valve disc 122 and thus wear the valve disc 122 faster than if the valve disc 122 is centered. Accordingly, the retaining clip 150 serves to maintain the centered alignment of the valve disc 122 once it is set during assembly of the valve 102.

A groove 160 can be formed in the first shaft to receive the first retaining clip 150 therein. In certain embodiments, the first retaining clip 150 can be a c-shaped retaining clip, e.g., as shown in FIG. 5A. A first shaft bushing 162 can be disposed in the second housing extension 120 radially between the first shaft 124 and an inner diameter 164 of the second housing extension 120. As shown, the first retaining clip 150 can be disposed on the shaft axially outboard of the bushing 162.

In embodiments, in order to further maintain the alignment of the valve disc 122, the system can include a first plurality of shims 166. As best seen in FIGS. 5B and 5C, the first retaining clip 150 can be axially separated from the first bushing 162 by at least one shim 166a of the first plurality of shims 166. At least one additional shim 166b of the plurality of shims 166 can be axially outboard of the retaining clip 150. The shim pack 166 can be used so that the inner shim(s) 166a, e.g., those closer to the valve disc 122 set the center alignment of the valve disc 122 within the housing 104, while the outer shims 166b (e.g., those closer to the connecting flange 118), remove or control any additional axial end play of the shaft 124.

In embodiments, a sealing member 168 can be disposed at least partially within the second housing extension 120 and can extend onto a face of the second connecting flange 118 of the first valve 102. The at least one additional shim 166b of the first plurality of shims 166 can be disposed on the shaft 124 axially between the shaft retaining clip 150 and the sealing member 168. In FIGS. 4-5B, two additional shims 166b are shown axially outboard of the retaining clip 150, between the retaining clip and the sealing member.

In embodiments, a diameter 170 of the retaining clip 150 and a diameter 172 of the shims 166 can be greater than a diameter 174 of the bushing 162. In embodiments, the outer diameter 170 of the retaining clip can contact the inner diameter 164 of the second housing extension 120. In embodiments, an inner diameter 176 of the retaining clip can be configured (e.g., sized) to provide loose but low clearance fit relative to the first shaft 124. The low clearance fit provides little space between the inner diameter 176 of the retaining clip 150 and an outer diameter 178 of the first shaft 124, but is loose enough such that the first shaft 124 rotates within the retaining clip 150 but the retaining clip 150 remains rotationally stationary.

With reference now to FIGS. 6-9B, the modular air valve system 100 will be described having two valves, e.g., the first valve 102 as described above and the second valve 602 connected thereto, where the second valve 602 is connected to the first valve 102 at the first connecting flange 114. The components of the first valve 102 described above are not described again, and for the sake of brevity, common components of the second valve 602 already described above with respect to the first valve 102 are not repeated below for the second valve 602. In practice, the second valve 602 can be nearly identical to the first valve 102, depending on a relative position of the valve in the larger valve assembly. For example, terminal valves, those at the end of the valve assembly may have slight differences, for example a terminal valve will include a crank 130. As shown in FIGS. 6-9B, because only two valves are shown, both can be considered terminal valves and can be representative of the terminal valves in the a larger valve assembly having any number of internal valves connecting therebetween.

Figure 7:
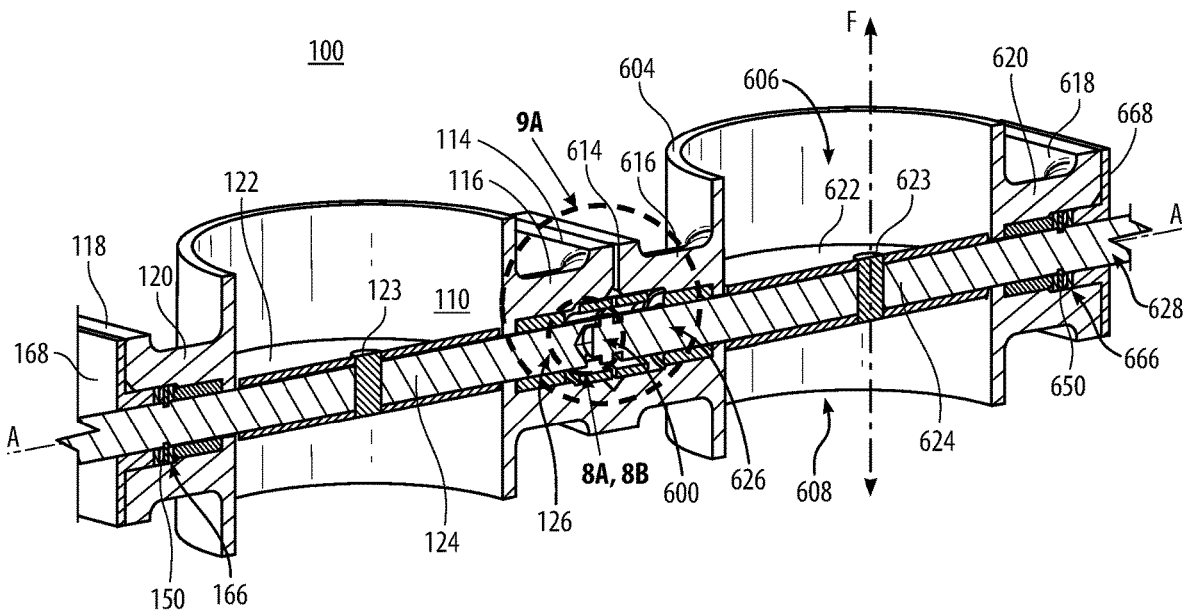
FIG. 7 is a partial cross-sectional view of the modular air valve system of FIG. 6 taken along line 7-7, showing a shaft interconnect region.

With reference first to FIGS. 6 and 7, as shown, the second valve disc 622 is mounted to the second shaft 624 via pin 623, disposed within the second housing 604 along the rotation axis A, which is now the same axis of rotation as the first valve such that the first and second valve discs 122, 622 will rotate with one another.

The first end 626 of the second shaft 624 extends through the third housing extension 616 and through the third connecting flange 614 to connect to the first end 126 of the first shaft 124 of the first valve 102 at a shaft interconnect region 680 to rotate the first valve disc 122 and the second valve disc together 622. The second end 628 of the second shaft 624 extends through the fourth housing extension 620 and the fourth connecting flange 618 and can either be configured to connect to a third shaft of a third valve (if an interior valve of the larger valve assembly daisy chain) or the second end of the second valve may not be connected to anything if it is a terminal valve as shown.

Now referring to FIGS. 7-9A, in embodiments, the shaft interconnect region 680 can include the first end 126 of the first shaft 124 and the first end 626 of the second shaft 624. In embodiments the first end 126 of the first shaft 124 and the first end 626 of the second shaft 624 are configured to couple with one another to rotationally lock the first shaft 124 and the second shaft 624 to one another such that the first shaft 124 and the second shaft 624, and the first valve disc 122 and the second valve disc 622 rotate together along the common rotation axis A.

Figure 8A:
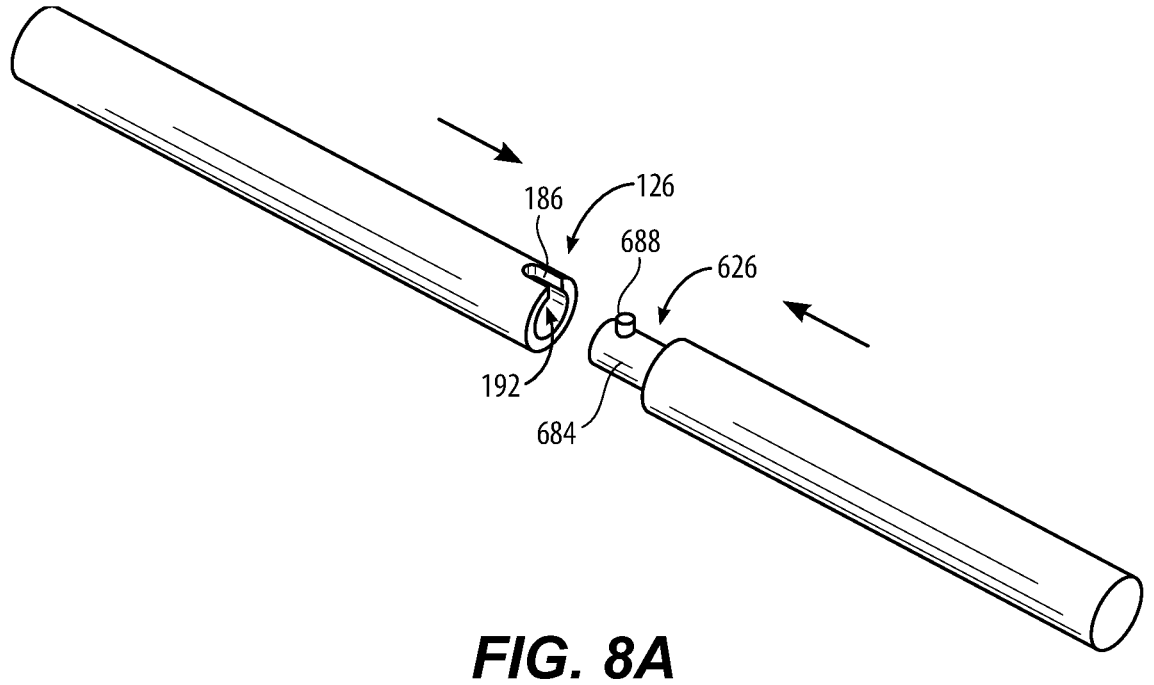
FIG. 8A is an exploded perspective view of a first shaft of a first modular air valve and a second shaft of a second modular air valve, exploded from one another.
Figure 8B:
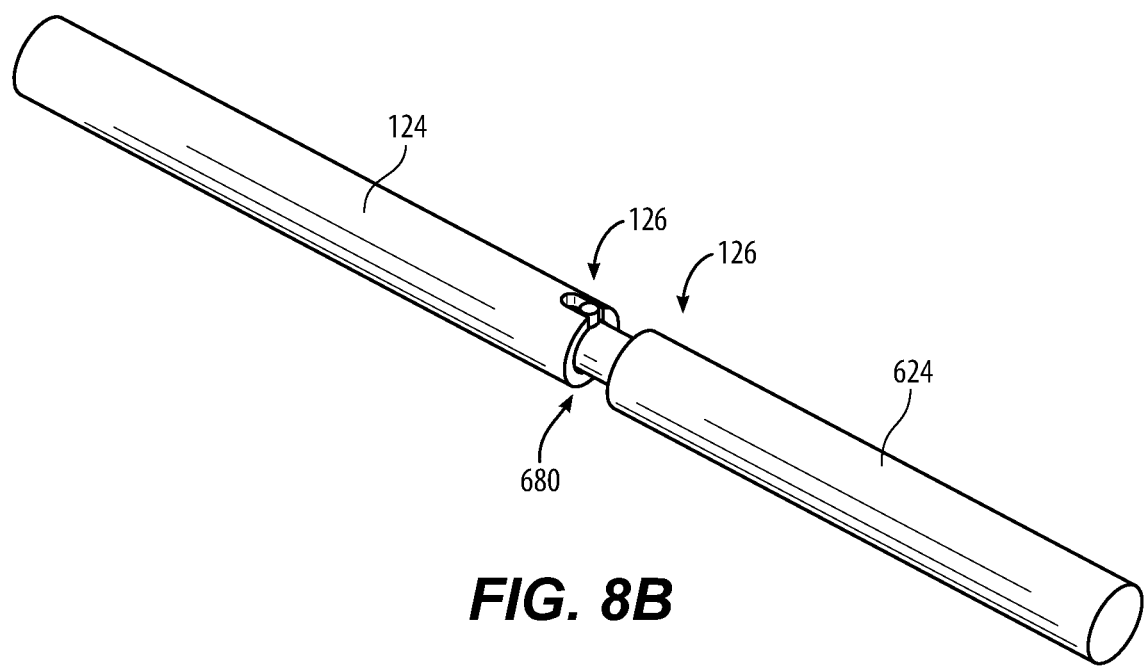
FIG. 8B is a perspective view of the first shaft of the first modular air valve and the second shaft of the second modular air valve, shown connected to one another at a shaft interconnect.

In certain embodiments, e.g., as shown in FIG. 7, the shaft interconnect region 680 can include, on the first end 126 of the first shaft 124, a recess 182 configured to accept a locking protrusion 684 on the first end 626 of the second shaft 624. The locking protrusion 684 can be configured to be inserted into the recess 182 by sliding along the rotational axis A. As shown in FIGS. 8A and 8B, in certain embodiments, the recess 182 can include a slot 186 and the locking protrusion 684 can include a tab 688 configured to axially slide within the slot 186 to rotationally lock the first shaft 124 to the second shaft 684. The shaft interconnect must be able to swivel and pivot about the joint called out by the 9A indicator in FIG. 7, based on mounting imperfection at the mounting flange 112.

Figure 9B:
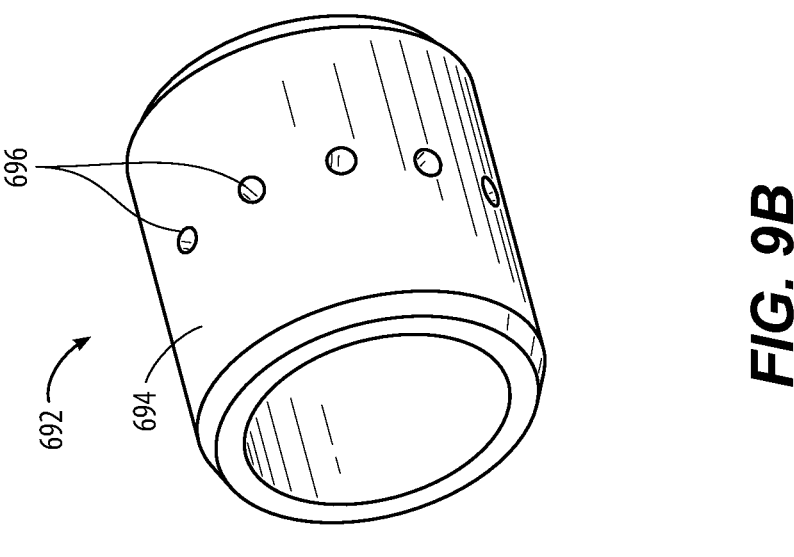
FIG. 9B shows an embodiment of a porting bushing configured to be disposed at the shaft interconnect region.
Figure 9A:
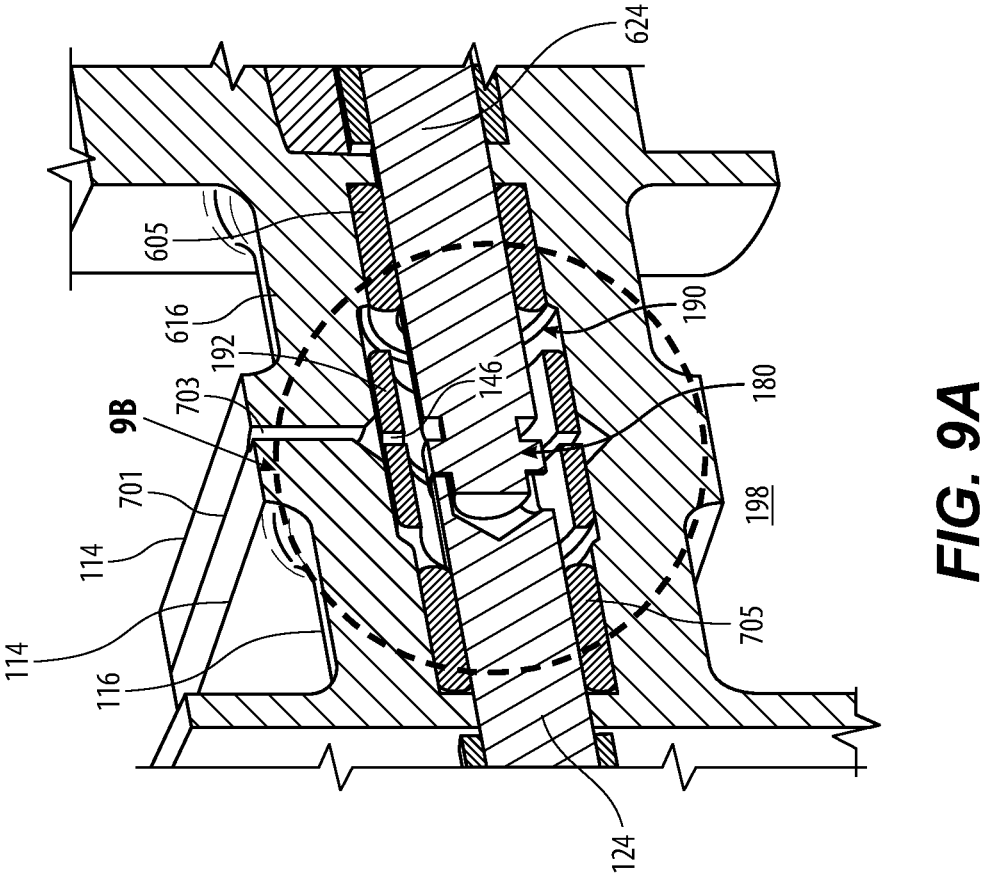
FIG. 9A shows an enlarged view of the shaft interconnect region of outlined in FIG. 7, showing a porting path.

With reference now to FIGS. 9A and 9B, with the first and second valves 102, 602 connected, the first housing extension 116 of the first valve 102 and the third housing extension 616 of the second valve 602 form an interior space 690, and the shaft interconnect region 680 can be disposed within the interior space 690. A porting bushing 692 can be disposed in the interior space 690, partially around the first shaft 124 and partially around the second shaft 624 at the shaft interconnect region 680. The porting bushing 692 can include a bushing body 694 and plurality of vents 696 disposed circumferentially thereabout and defined through the bushing body 694 to allow for ambient venting between the interior space 690 and an ambient environment 698, for example to pressure balance the first shaft 124 and the second shaft 624. When the first valve 102 and the second valve 602 are connected, a seam 701 created by the interfacing of the first connecting flange 114 of the first valve 102 and the third connecting flange 614 of the second valve 602 can form a vent port 703 for fluid communication between the interior space 690 and the ambient environment 698 through the vents 696 of the bushing. Each of the first shaft 124 and the second shaft 624 can also include traditional bushings 104, 705 within the respective housing extensions, axially outboard of the porting bushing 692.

While the terminal connecting flanges 118, 618 of the first valve 102 and the second valve 602 include sealing members 168, 668, when the first valve 102 is connected to the second valve 602, no sealing member is disposed between the first connecting flange 114 of the first valve 102 and the third connecting flange 614 of the second valve 602 (e.g., at the seam 701). If the first valve is not connected to a second valve, both the first connecting flange and the second connecting flange can each have sealing members. In embodiments, the sealing members 168, 688 can by dynamic sealing members.

As mentioned above, when the valve system 100 includes more than one valve in the larger valve assembly, only one crank 130 is included on the second end 128 of the first shaft 124 (or on one free end of a shaft of a terminal valve). The clocking of the crank 130 will set the predefined rotational quadrant of all of the valve discs in the whole valve assembly since they will all rotate together. In the example shown in FIG. 6, the crank arm 132 is shown at a different angle (e.g., θ2) relative to the valve discs 122, 622 than in FIGS. 1 and 2, for example. In FIG. 6, the crank arm 132 is angled nearly parallel to the valve discs, 122, 622 and the first position will be a max flow position because the valve discs 122, 622 will be nearly horizontal at the 3 o'clock position. The second position of the valve discs 122, 622 will be a second open position, because the valve discs 122, 622 will not reach the fully closed position.

In this example, in the first clocking step, the crank 132 is secured to the shaft 124 at a circumferential position where the valve discs 122, 622 are limited to the rotational quadrants of 9 o'clock to 3 o'clock or 3 o'clock to 9 o'clock. The second clocking step, setting the pin 140 in the lower location as shown, clocks the crank 130 to rotate between 12 o'clock to 3 o'clock. However, because the crank arm 132 is not exactly parallel to the valve discs 122, 622 in FIG. 6, the 12 o'clock to 3 o'clock quadrant is only an approximation for the sake ease of explanation.

Also shown in FIG. 7, when the valve system 100 includes multiple valves, the shafts of terminal valves can each include the above described retaining clip 150, 650 and shim packs 166, 666 to set to the alignment of the respective valve disc 122, 622 within the respective housings 104, 604. In such embodiments, the interior valves, e.g., those between the terminal vales, can have shafts where one end includes a male end (e.g., the locking protrusion) of the shaft interconnect 690, and the opposite end includes a female end (e.g., the recess) of the shaft interconnect 690. A porting bushing 692 as described above can also be included at each shaft interconnect region 690 of the system.

Figure 10A:
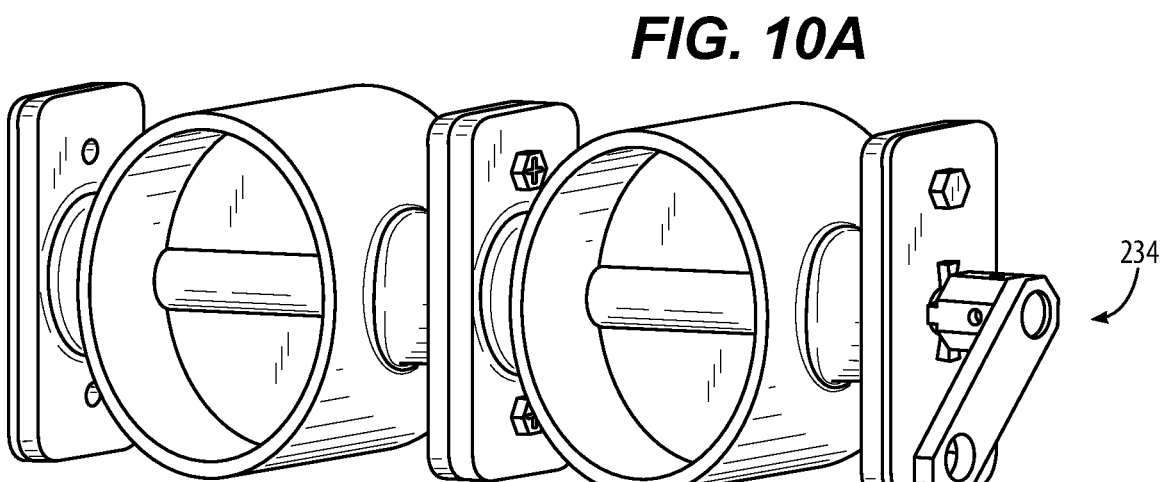
FIG. 10A is a perspective view of an embodiment of a modular air valve system, having two modular air valves connected to one another.
Figure 10B:
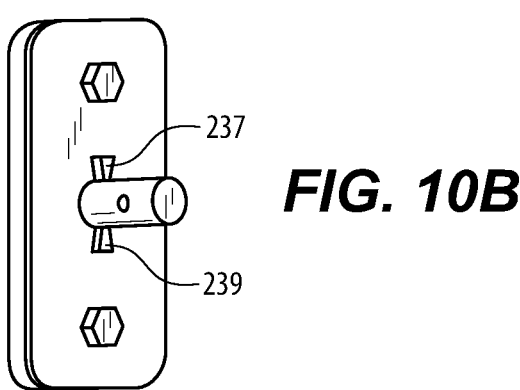
FIG. 10B is a perspective view of an embodiment of crank stop of another crank system shown in FIG. 10A.
Figure 10C:
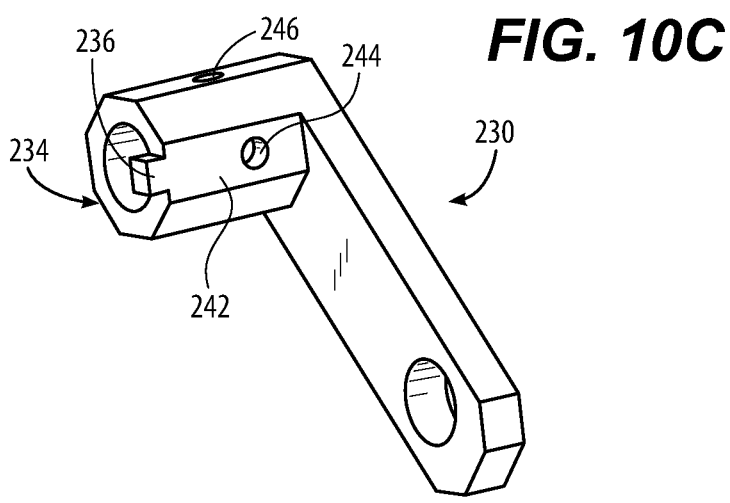
FIG. 10C is a perspective view of an embodiment of a crank of the crank system shown in FIG. 10A.

In certain embodiments, e.g., as shown in FIGS. 10A-10C, in accordance with at least one aspect of this disclosure, the valve can include a crank stop 234, which can be similar to the crank stop 134 shown in FIGS. 2-3C, but rather than include the first and second legs 136, 138 and pin 148, the crank stop 234 can include one or more protrusions 236 extending from the crank sleeve 242 configured to contact one or more guides 237, 239 on the connecting flange 118 of the first valve 102 to physically limit rotation of the crank 230 to the predefined rotational quadrant. Similarly, in this configuration, a circumferential position of the first securing hole 244 and second securing hole 246 on a circumference of the first shaft 124 will clock the crank arm 230 within the predefined rotational quadrant. However, different than the crank stop 134 shown in FIGS. 2-3C, crank stop 234 need not include two clocking steps, and instead clocking the crank 230 on the shaft based on the securing holes 244, 246 will clock the crank 230 and valve disc 122 to rotate within the predefined rotational quadrant.

Traditional air butterfly valve designs are custom, application specific, single bore configurations. Embodiments of the modular air valve (MAV) system as disclosed herein includes a modular design that allows "daisy chaining" of valve assemblies to handle larger flow volumes with flexible packaging. Embodiments of the MAV can be configured with simple a crank to allow for multiple controlling inputs such as cabling or direct connection to actuation (e.g., via a drive linkage). In addition, the MAV system can be comprised of the minimum parts needed to allow customizing for various fluid temperatures. Embodiments of the MAV include a simplistic housing that can allow for light weight and multiple use from the same housing. Embodiments of the MAV can have a modular design configured with attachment flanges (e.g., the connecting flanges described above) to allow valves to be interconnected to facilitate larger flow demands and narrower envelopes. The valve housing can be wide enough to contain the rotating piece parts with mating flanges to allow interconnection of multiple MAVs in the daisy chain or sealing for single valve configurations. The valve disc can be configured to rotate/extend beyond the housing, utilizing adjacent ducting for clearance to minimize weight. In embodiments, the shaft is pressure balanced to reduce torque. In embodiments, the MAV can be configured with a simple crank to facilitate multiple controlling inputs such as cabling or direct connection to actuation. The housing can include symmetric connecting flanges to allow multiple uses and/or orientations. Traditionally, a duct mounted valve will include a single valve, and a manifold mounted valve system would include multiple valves. Embodiments of the MAV can use a single MAV for a duct mount, or if can daisy chain multiple of the same MAVs together for use with a manifold, for example. In embodiments, the MAV(s) can be mounted to a system having a single fluid source and a single fluid destination, or multiple MAVs can take a fluid from a single source and direct it to many different destinations.

Traditional air butterfly valve designs can be inherently assembly proof due to single application inlet/outlet configurations or internal linkage limitation. However, because embodiments of the MAV and MAV system includes a novel symmetrical style butterfly valve that can be used in many locations, the MAV should be assembly proof. Embodiments of the crank stop disclosed herein provide such assembly proofing. At the time of assembly, the crank and disc can spin freely in the assembly, therefore there is a need to control the crank and disc for proper operation and assembly into the larger system. Embodiments of the crank stop can provide physical bounding of the crank and disc rotation to provide a simple solution for ensuring assembly proofing. In the example MAV shown in the Figures, the MAV is shown using an existing bolted joint adjacent to the crank. One fastener is replaced by a bolted stud (e.g., pin 140) that stands proud of the assembly within the range of the crank, in embodiments, the crank legs. The crank can include the first and second crank legs as travel limiters, which can define start and stop positions, slightly beyond minimum and maximum rotation desired for the valve disc. When the MAV is assembled, the crank will be positioned in the correct quadrant of operation. If the crank is mis-installed by the end user (e.g., the MAV is installed in an incorrect orientation), the user attempting to connect the crank to the drive linkage will not be able to install the MAV at all, thus ensuring correct installation. Embodiments of the crank and crank stop described herein provides a highly reliable, simple, cost-effective, assembly proofing of the MAV. End users can benefit from reduced inventory due to the multiuse configuration and confidence knowing the MAV is installed correctly.

Embodiments of the modular air valve (MAV) system 100 can include a new style butterfly valve suitable for engine multiuse application. A single MAV can be linked together with one or more additional MAVs to increase the flow capability with a lower profile envelope. Due to normal machine tolerance and mounting/interface imperfection, the shaft interconnect, i.e., the location where the shafts of different valves connect, needs flexibility to prevent binding of the shaft. Embodiments of the locking protrusion as disclosed herein can provide better flexibility with the least tolerance stack (e.g., end play). In embodiments, the MAV is a pressure balanced, modular air valve. When multiple MAVs are connected, each interface needs flexibility. Each MAV can include its own shaft but can be configured to connect to either one or two additional shafts when the MAVs are strung together. One of shaft can include a radially protruding pin (e.g., the locking tab), while the other shaft can include a close tolerance slot. Because of the single interface, the pin will have axial freedom and rotational flexibility in two of three orthogonal directions which can be critical for modular systems. Having two separate shafts allows for modularity but further prevents bending of the shaft at the interconnect, which could occur of the valve discs were mounting on a common shaft. Within the shaft interconnect region 690, the shafts can be axially spaced to prevent thermal and/or vibratory binding, and the torque can be transmitted through a single pin connection (e.g., the radially extending locking tab. Embodiments of the shaft interconnect described herein can provide a highly reliable, simple, cost-effective, high-pressure air valve having a multi-use configuration that allows for reduced cost and inventory. Embodiments of the MAV allows for a lightweight design and multiple connections for greater air flow in radially tighter envelopes.

In certain instances, historical air butterfly design have pressure loaded shaft that require thrust management. When combining valves in the daisy chain, an ambient exposure is needed on the shaft ends (e.g., where the shafts connect to one another) to provide shaft pressure balancing. Embodiments of a pilot bushing (referred to as a porting bushing herein) provide a simple solution for ensuring the ambient ported along with providing eccentric control to minimize binding due to shaft rotation. Embodiments of the porting bushing described herein can be disposed at the interconnect between MAVs. The porting bushing can have a design fit to control the eccentricity of the connecting shaft (e.g., to prevent shaft binding) as well as provide the ambient porting required for pressure balance. The porting bushing can include venting and/or filtering holes therein which can port ambient pressure though a housing channel to the shaft ends within the interconnect. In embodiments, the porting bushing control concentricity and allows the shafts to come together to be concentric. In embodiments, such as shown in the Figures, the ambient port should be at the center at the interconnect pressure. If the port to ambient were at another location, then the interconnect would receive pressure from the inlet of the valve, while the flange would receive the ambient pressure. Additionally, the venting/porting holes can be sized for allowing filtering of foreign object debris, in addition to porting.

Traditional butterfly valve designs can have pressure loaded shafts that require thrust management. However, embodiments of the MAV provide for a novel valve that is pressure balanced and precludes itself from thrust management of the shaft and disc. In embodiments, the shaft within the MAV can include a retaining clip (e.g., clip 150) which is positioned by the assembly piece parts. The configuration of the retaining clip can further include a shim pack to further center and retain the disc. Embodiments of the MAV can be a pressure balanced, modular air valve. In embodiments, the shaft and disc assembly are centered and retained via the retaining clip. The shaft can include a groove which accepts the "C" shaped retaining clip. The retaining clip can have a close tolerance fit to the shaft and allows rotation of the shaft. As shown, the clip can extend above the outer diameter of the shaft where it is retained in the assembly. In embodiments, shims on both sides of the retaining clip allow centering of the disc. Due to pressure balancing of the shaft, minimal contact area on the retaining clip is needed in the axial direction. this is a new way to retain the shaft. we want to center the blue disk within the housing. Embodiments of the pressure balanced shaft remove axial loads on the retaining clip. The location of the shim pack and retaining clip can be closer to the disc than in traditional systems, which allows for lower tolerance between the disk and the valve housing inner diameter, and further, the shorter distance between the disc and the retaining clip reduces the influences thermal changes.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A modular valve system comprising:
a first valve configured to connect to one or more additional valves, including:
a first housing having a first inlet and a first outlet with a cylindrical flow path through the first housing defined between the first inlet and the first outlet along a flow axis, wherein a diametral plane is defined diametrically spanning the cylindrical flow path;
a mounting flange extending from the first housing at the first inlet or the first outlet configured to mount the first valve to a first structure;
a first connecting flange extending from the first housing via a first housing extension in a first direction configured to connect the first valve to a second valve, and a second connecting flange extending from the first housing via a second housing extension in a second direction opposite the first direction configured to connect the first valve to a third valve or a second structure;
a first valve disc mounted to a first shaft disposed within the first housing along a rotation axis for rotation between a first position of the first valve disc allowing a first flow amount through the cylindrical flow path and a second position of the first valve disc allowing a second flow amount through the cylindrical flow path,
wherein a first end of the first shaft extends through the first housing extension and through the first connecting flange and is configured to connect to a second shaft of the second valve and wherein a second end of the first shaft extends through the second housing extension and the second connecting flange and is configured to connect to a crank of the first valve or to a third shaft of the third valve.

2. The modular valve system of claim 1, wherein the first valve is symmetric about the rotation axis and is symmetric about a vertical axis.

3. The modular valve system of claim 1, wherein the first valve is configured to be reversible such that the first inlet can be a first inlet or a first outlet and the first outlet can be a first outlet or a first inlet.

4. The modular valve system of claim 1, further comprising the second valve, wherein the second valve includes:
a second housing having a second inlet and a second outlet with a cylindrical flow path defined through the second housing between the second inlet and the second outlet, wherein a diametral plane is defined diametrically spanning the cylindrical flow path;
a second mounting flange extending from the second housing at the second inlet or the second outlet configured to mount the second valve to the first structure;
a third connecting flange extending from the second housing via a third housing extension in a first direction configured to connect to the first connecting flange of the first valve in a daisy chain and a fourth connecting flange extending from the second housing via a fourth housing extension in a second direction opposite the first direction configured to connect the second valve to a fourth valve;
a second valve disc mounted to a second shaft disposed within the second housing along the rotation axis for rotation between a first position of the second valve disc allowing a first flow amount through the cylindrical flow path and a second position of the second valve disc allowing a second flow amount through the cylindrical flow path, wherein a first end of the second shaft extends through the third housing extension and through the third connecting flange and connects to the first end of the first shaft of the first valve at a shaft interconnect region to rotate the first valve disc and the second valve disc together, and wherein a second end of the second shaft extends through the fourth housing extension and the fourth connecting flange and is configured to connect to the third shaft of the third valve.

5. The modular valve system of claim 4, wherein the shaft interconnect region includes the first end of the first shaft and the first end of the second shaft, wherein the first end of the first shaft and the first end of the second shaft are configured to couple to one another to rotationally lock the first shaft and the second shaft to one another such that the first valve disc and the second valve disc rotate together along a common rotation axis.

6. The modular valve system of claim 5, wherein the shaft interconnect region includes: on the first end of the first shaft, a recess configured to accept a locking protrusion; and on the first end of the second shaft, the locking protrusion configured to be inserted into the recess on first end of the first shaft.

7. The modular valve system of claim 6, wherein the recess further includes a slot, and wherein the locking protrusion includes a tab configured to slide within the slot to rotationally lock the first shaft to the second shaft.

8. The modular valve system of claim 5, further comprising, a crank disposed on the second end of the first shaft axially outboard of the second connecting flange configured to rotate with the first shaft, the first valve disc, the second shaft, and the second valve disc, the crank including a crank arm configured to connect to a drive linkage and a crank stop configured to limit rotation of the crank to a predefined rotational quadrant of the first valve disc and the second valve disc within the first and second housings to define the first position and the second position of the first and second valve discs based on an angle of the crank arm relative to the first and second valve discs.

9. The modular valve of claim 8, wherein the crank stop is circumferentially aligned on the shaft relative to the rotation axis to allow the crank arm to rotate the first valve disc and the second valve disc within the predefined rotational quadrant such that if one of the first valve or second valve is mounted to the first structure incorrectly, the crank stop will prevent the crank arm from connecting to the drive linkage.

10. The modular valve system of claim 7, wherein the shaft interconnect region is disposed within an interior space defined by the first housing first housing extension of the first valve and the third housing extension of the second valve, and further comprising a bushing disposed within the interior space partially around the first shaft and partially around the second shaft at the shaft interconnect region, wherein the bushing includes a plurality of vents disposed circumferentially thereabout to allow for ambient venting between the interior space and the ambient environment.

11. The modular valve system of claim 10, wherein a seam created by an interfacing of the first connecting flange of the first valve and the third connecting flange of the second valve forms a vent port for fluid communication between the interior space and the ambient environment through the plurality of vents of the bushing.

12. The modular valve system of claim 11, further comprising a first sealing member disposed at least partially within the second housing extension and extending onto a face of the second connecting flange of the first valve, and a second sealing member disposed at least partially within the fourth housing extension and extending onto a face of the fourth connecting flange of the second valve, wherein there is no sealing member disposed between the first connecting flange of the first valve and the third connecting flange of the second valve.

13. A modular valve system comprising:

a first valve configured to connect to one or more additional valves, including:

a first housing having a first inlet and a first outlet with a cylindrical flow path through the first housing defined between the first inlet and the first outlet along a flow axis, wherein a diametral plane is defined diametrically spanning the cylindrical flow path;

a mounting flange extending from the first housing at the first inlet or the first outlet configured to mount the first valve to a first structure;

a first connecting flange extending from the first housing via a first housing extension in a first direction configured to connect the first valve to a second valve, and a second connecting flange extending from the first housing via a second housing extension in a second direction opposite the first direction configured to connect the first valve to a third valve or a second structure;

a first valve disc mounted to a first shaft disposed within the first housing along a rotation axis for rotation between a first position of the first valve disc allowing a first flow amount through the cylindrical flow path and a second position of the first valve disc allowing a second flow amount through the cylindrical flow path, wherein a first end of the first shaft extends through the first housing extension and through the first connecting flange and is configured to connect to a second shaft of the second valve, and wherein a second end of the first shaft extends through the second housing extension and the second connecting flange and is configured to connect to a crank of the first valve or to a third shaft of the third valve, and wherein the first valve is symmetric about the rotation axis and is symmetric about a vertical axis, and wherein the first valve is configured to be reversible such that the first inlet can be a first inlet or a first outlet and the first outlet can be a first outlet or a first inlet.

14. The modular valve system of claim 13, further comprising the second valve, wherein the second valve includes:

a second housing having a second inlet and a second outlet with a cylindrical flow path defined through the second housing between the second inlet and the second outlet, wherein a diametral plane is defined diametrically spanning the cylindrical flow path;

a second mounting flange extending from the second housing at the second inlet or the second outlet configured to mount the second valve to the first structure;

a third connecting flange extending from the second housing via a third housing extension in a first direction configured to connect to the first connecting flange of the first valve in a daisy chain and a fourth connecting flange extending from the second housing via a fourth housing extension in a second direction opposite the first direction configured to connect the second valve to a fourth valve;

a second valve disc mounted to a second shaft disposed within the second housing along the rotation axis for rotation between a first position of the second valve disc allowing a first flow amount through the cylindrical flow path and a second position of the second valve disc allowing a second flow amount through the cylindrical flow path, wherein a first end of the second shaft extends through the third housing extension and through the third connecting flange and connects to the first end of the first shaft of the first valve at a shaft interconnect region to rotate the first valve disc and the second valve disc together, and wherein a second end of the second shaft extends through the fourth housing extension and the fourth connecting flange and is configured to connect to the third shaft of the third valve.

15. The modular valve system of claim 14, wherein the shaft interconnect region includes the first end of the first shaft and the first end of the second shaft, wherein the first end of the first shaft and the first end of the second shaft are configured to couple to one another to rotationally lock the first shaft and the second shaft to one another such that the first valve disc and the second valve disc rotate together along a common rotation axis.

16. The modular valve system of claim 15, wherein the shaft interconnect region includes: on the first end of the first shaft, a recess configured to accept a locking protrusion;

and on the first end of the second shaft, the locking protrusion configured to be inserted into the recess on first end of the first shaft.

17. The modular valve system of claim 16, wherein the recess further includes a slot, and wherein the locking protrusion includes a tab configured to slide within the slot to rotationally lock the first shaft to the second shaft.

18. The modular valve system of claim 15, wherein the shaft interconnect region is disposed within an interior space defined by the first housing first housing extension of the first valve and the third housing extension of the second valve, and further comprising a bushing disposed within the interior space partially around the first shaft and partially around the second shaft at the shaft interconnect region, wherein the bushing includes a plurality of vents disposed circumferentially thereabout to allow for ambient venting between the interior space and the ambient environment.

19. The modular valve system of claim 18, wherein a seam created by an interfacing of the first connecting flange of the first valve and the third connecting flange of the second valve forms a vent port for fluid communication between the interior space and the ambient environment through the plurality of vents of the bushing.

20. The modular valve system of claim 19, further comprising a first sealing member disposed at least partially within the second housing extension and extending onto a face of the second connecting flange of the first valve, and a second sealing member disposed at least partially within the fourth housing extension and extending onto a face of the fourth connecting flange of the second valve, wherein there is no sealing member disposed between the first connecting flange of the first valve and the third connecting flange of the second valve.

* * * * *